United States Patent
Takahata et al.

(10) Patent No.: US 9,531,033 B2
(45) Date of Patent: Dec. 27, 2016

(54) LITHIUM SECONDARY BATTERY AND MANUFACTURING METHOD THEREFOR

(75) Inventors: Koji Takahata, Toyota (JP); Koji Kawamoto, Aichi-ken (JP); Kazuhisa Takeda, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 12/937,730

(22) PCT Filed: Apr. 10, 2009

(86) PCT No.: PCT/JP2009/057399
§ 371 (c)(1),
(2), (4) Date: Oct. 14, 2010

(87) PCT Pub. No.: WO2009/128410
PCT Pub. Date: Oct. 22, 2009

(65) Prior Publication Data
US 2011/0039160 A1    Feb. 17, 2011

(30) Foreign Application Priority Data
Apr. 17, 2008    (JP) .................................. 2008-107359

(51) Int. Cl.
*H01M 4/58* (2010.01)
*H01M 10/052* (2010.01)
(Continued)

(52) U.S. Cl.
CPC ............. *H01M 10/052* (2013.01); *H01M 2/34* (2013.01); *H01M 2/345* (2013.01); *H01M 4/131* (2013.01); *H01M 4/1391* (2013.01); *H01M 4/62* (2013.01); *H01M 4/624* (2013.01); *H01M 10/4235* (2013.01); *H01M 10/0525* (2013.01); *H01M 2200/20* (2013.01); *Y02E 60/122* (2013.01); *Y02P 70/54* (2015.11); *Y02T 10/7011* (2013.01); *Y10T 29/49115* (2015.01)

(58) Field of Classification Search
USPC ....................................................... 429/231.1
See application file for complete search history.

(56) References Cited

FOREIGN PATENT DOCUMENTS

| JP | 5-151997 | 6/1993 |
|---|---|---|
| JP | 5-182667 | 7/1993 |

(Continued)

OTHER PUBLICATIONS

International Search Report in International Application No. PCT/JP2009/057399; Mailing Date: Jul. 7, 2009.

*Primary Examiner* — Tracy Dove
(74) *Attorney, Agent, or Firm* — Finnegan, Henderson, Farabow, Garrett & Dunner, LLP (57) ABSTRACT

A lithium secondary battery (10) provided by the present invention includes a current interruption mechanism (40) operated by a rise in internal pressure. A positive electrode (32) of this battery (10) has a positive electrode mixture layer containing lithium carbonate, a conductive material and a positive electrode active material consisting primarily of a lithium-transition metal oxide. The lithium carbonate is disposed on the surface of the conductive material. Such a positive electrode mixture layer can preferably be fabricated using a positive electrode mixture composition containing a positive electrode active material and a composite conductive material comprising lithium carbonate retained on the surface of a conductive material.

6 Claims, 2 Drawing Sheets

(51) Int. Cl.
*H01M 2/34* (2006.01)
*H01M 4/131* (2010.01)
*H01M 4/1391* (2010.01)
*H01M 4/62* (2006.01)
*H01M 10/42* (2006.01)
*H01M 10/0525* (2010.01)

(56) References Cited

FOREIGN PATENT DOCUMENTS

| | | |
|---|---|---|
| JP | 5-242913 | 9/1993 |
| JP | 2001-126718 | 5/2001 |
| JP | 2001-307774 | 11/2001 |
| JP | 2002-110251 | 4/2002 |
| JP | 2002-270179 | 9/2002 |
| JP | 2003-123764 | 4/2003 |
| JP | 2005-267966 | 9/2005 |
| JP | 2007-103134 | 4/2007 |
| JP | 2007-227310 | 9/2007 |

LITHIUM SECONDARY BATTERY AND MANUFACTURING METHOD THEREFOR

TECHNICAL FIELD

This application is a national phase application of International Application No. PCT/JP2009/057399, filed Apr. 10, 2009, and claims the priority of Japanese Patent Application No. 2008-107359, filed on Apr. 17, 2008, the entire contents of both of which are incorporated herein by reference. The present invention relates to a lithium secondary battery (typically a lithium ion battery), and specifically relates to a lithium secondary battery provided with a current interruption mechanism operated by a rise in internal pressure.

BACKGROUND ART

In recent years, lithium ion batteries and other sealed batteries (typically secondary batteries) have become more and more important as vehicle-mounted power sources and as power sources for computers, portable devices and the like. Lithium ion batteries in particular provide high energy densities with low weight, which makes them attractive as vehicle-mounted high output power sources.

Meanwhile, lithium ion batteries produce heat if they are overcharged due to operational error, improper use or the like, and may even overheat. To prevent overheating during overcharge, it has been proposed for example that the internal pressure of the battery could be elevated by means of $CO_2$ gas generated by an electrochemical decomposition reaction of lithium carbonate contained in the materials making up the positive electrode, and a current interruption mechanism could be operated by means of this rise in internal pressure. Patent Documents 1 to 3 are given as documents of prior art relating to this type of technology.

Patent Document 1: Japanese Patent Application Laid-open No. H05-242913
Patent Document 2: Japanese Patent Application Laid-open No. H05-151997
Patent Document 3: Japanese Patent Application Laid-open No. H05-182667

DISCLOSURE OF THE INVENTION

However, in a battery equipped with such a current interruption mechanism using lithium carbonate in the positive electrode as an internal pressure elevator, if the lithium carbonate is disposed within or on the surface of the particles of positive electrode active material (typically, a lithium-transition metal oxide), the lithium carbonate may interfere with the movement of lithium ions in and out of the active material particles or within the particles, tending to raise the internal resistance (reaction resistance) of the battery. For example, such a rise in internal resistance is likely in embodiments using active material particles intentionally produced with a high lithium carbonate content, either by using an excess of lithium carbonate when firing (synthesizing) the lithium-transition metal oxide or by firing in the presence of $CO_2$ gas, and in embodiments using a composition consisting simply of a mixture of the positive electrode material particles and lithium carbonate. This rise in internal resistance results in a decrease in battery output. It is especially important to control internal resistance in the case of vehicle-mounted batteries and other batteries requiring high output.

It is an object of the present invention to provide a lithium secondary battery provided with a current interruption mechanism operated by a rise in internal pressure, which is a battery having improved battery performance (such as lower internal resistance). It is another object of the present invention to provide a method for manufacturing such lithium secondary battery.

A lithium secondary battery provided with a current interruption mechanism operated by a rise in internal pressure is provided by the present invention. A positive electrode of this battery has a positive electrode mixture layer containing lithium carbonate, a conductive material and a positive electrode active material consisting primarily of a lithium-transition metal oxide. The lithium carbonate is disposed on the surface of the conductive material.

With a positive electrode of this configuration, because the lithium oxide ($Li_2CO_3$) is disposed on the surface of the conductive material (which does not participate directly in the battery reaction), the battery performance (such as internal resistance) is less affected, and it is possible to achieve a lithium secondary battery provided with a mechanism using lithium carbonate to interrupt current during overcharge. Thus, another aspect of the present invention provides a positive electrode suitable as a constituent element (component) of a lithium secondary battery provided with the aforementioned current interruption mechanism.

In this Description, a "lithium secondary battery" is a secondary battery that uses lithium ions as electrolyte ions, wherein charge and discharge are achieved by means of movement of charge accompanying lithium ions between the positive and negative electrodes. Secondary batteries commonly called lithium ion batteries are typical examples of the lithium secondary batteries in this Description.

The conductive material is preferably one having a specific surface area of about 100 $m^2/g$ or more (such as about 100 to 500 $m^2/g$). With such a conductive material (such as carbon black or another conductive carbon material), the lithium carbonate as an internal pressure elevator can be spread more thinly and widely on the surface of the conductive material than when using a conductive material with a smaller specific surface area. This increases the reactive area of the lithium carbonate, and can increase the production efficiency of $CO_2$ gas during charge and discharge. As a result, the current interruption mechanism can be operated more appropriately (at an earlier stage) even if the battery is overcharged with a greater charge current (quick charge).

The percentage content of the lithium carbonate in the positive electrode mixture layer is preferably about 1 to 10 mass % (or more preferably about 2 to 6 mass %). With this composition, it is possible to minimize the impact on battery performance while operating the current interruption mechanism more appropriately.

A method for manufacturing a lithium secondary battery provided with a current interruption mechanism operated by a rise in internal pressure is provided by the present invention. This method comprises a step of preparing (manufacturing, purchasing or the like) a composite conductive material comprising lithium carbonate retained (coated for example) on the surface of a conductive material. It also comprises a step of preparing a positive electrode mixture composition comprising this composite conductive material and a positive electrode active material consisting primarily of a lithium-transition metal oxide. It also comprises a step of fabricating a positive electrode provided with a positive electrode mixture layer using this composition (for example, a positive electrode mixture layer formed by applying a collector to this composition). It also comprises a step of constructing a battery using this positive electrode.

With this method, it is possible to obtain a lithium secondary battery provided with a positive electrode having a positive electrode mixture layer containing the aforementioned positive electrode active material, the aforementioned conductive material and lithium carbonate disposed on the surface of the conductive material. Thus, this manufacturing method can be used favorably as a method for manufacturing any of the lithium secondary batteries disclosed here. Another aspect of the present invention provides a method for manufacturing a positive electrode suitable as a constituent element (component) of any of the lithium secondary batteries disclosed here.

In a preferred embodiment, a composition composed of the aforementioned positive electrode active material and composite conductive material dispersed in a liquid medium comprising a solvent (preferably a solvent that effectively does not dissolve lithium carbonate) and a binder is used as the positive electrode mixture composition. Using this composition, it is possible (by coating this composition on a sheet collector for example) to easily prepare a positive electrode mixture layer having the desired properties.

Preparation of the positive electrode mixture composition (positive electrode mixture composition preparation step) typically includes a dispersal step of dispersing the positive electrode active material and composite conductive material in a liquid medium comprising a solvent and a binder. This dispersal step is preferably accomplished by means of an embodiment encompassing a first mixing step of mixing the positive electrode active material, the solvent and binder, and a second mixing step of further mixing in the composite conductive material after the first mixing step. In this embodiment, a lithium secondary battery with better battery performance can be manufactured because it is possible to control the phenomenon of lithium carbonate retained on the surface of the composite material detaching and adhering to the surface of the positive electrode active material. A non-aqueous solvent (such as N-vinylpyrrolidone) can be used by preference as the solvent. The conductive material can preferably be one with a specific surface area of about 100 $m^2/g$ or more (such as about 100 to 500 $m^2/g$ for example).

In a preferred embodiment of the method disclosed here, the step of preparing a composite conductive material encompasses a step of supplying a lithium carbonate solution (typically an aqueous solution) to the conductive material, and drying the lithium carbonate solution to thereby coat the surface of the conductive material with lithium carbonate. For example, an embodiment in which a mixture (typically a dispersion) obtained by mixing the conductive material and the lithium carbonate solution is dried can be adopted by preference. The coated amount of the lithium carbonate (or in other words the amount of lithium carbonate in the composite conductive material) is preferably about 10 to 50 parts by mass per 100 parts by mass of the conductive material.

A composite conductive material having about 0.5 mg to 5 mg (more preferably about 1 mg to 4 mg) of lithium carbonate retained (coated for example) per 1 $m^2$ surface area of the conductive material can be used by preference as the composite conductive material. Using such a composite conductive material in which the lithium carbonate is spread thinly and widely on the surface of the conductive material, it is possible to manufacture a lithium secondary battery and a positive electrode for this battery wherein the aforementioned current interruption mechanism can operate more appropriately (at an earlier stage) even if the battery is overcharged with a greater charge current.

A vehicle equipped with any of the lithium secondary batteries disclosed here (which may be a lithium secondary battery manufactured by any of the methods disclosed here) is provided by the present invention. Because this lithium secondary battery has reduced internal resistance (reaction resistance), it may provide suitable high performance (such as high output) for a vehicle-mounted battery. As a result, it can be used favorably for example as a power source for driving to be mounted in an automobile or other vehicle.

DESCRIPTION OF EMBODIMENTS

Examples of preferred embodiments of the present invention are explained below. Matters that are not specifically mentioned in this Description and which may be necessary for carrying out the present invention can be understood as design matters for a person skilled in the art on the basis of known techniques in the field. The present invention can be carried out based on the contents disclosed in this description and on technical common knowledge in the field.

The technology disclosed here can be applied to lithium secondary batteries of various types that are constructed using positive electrodes provided with positive electrode active materials consisting primarily of lithium-transition metal oxides, and that are provided with current interruption mechanisms operated by a rise in internal pressure. A typical embodiment of the positive electrode of such a battery is a positive electrode having a configuration in which a positive electrode mixture layer containing a positive electrode active material, a conductive material and lithium carbonate (with the primary component or in other words 50 mass % or more being a lithium-transition metal oxide) is retained on a collector. A conductive metal material such as aluminum can be adopted favorably as the constituent material of the collector (positive electrode collector), as in common, conventional lithium secondary batteries. The form of the positive electrode collector it not particularly limited because it will differ depending on the shape and the like of the battery constructed using the positive electrode, and a variety of forms including bar, plate, sheet, foil and mesh forms and the like are possible. The technology disclosed here can be applied favorably to a lithium secondary positive electrode (sheet-like positive electrode) in which a positive electrode mixture layer is retained on a sheet or foil collector for example.

In a preferred embodiment of a lithium secondary battery constructed using such a positive electrode, an electrode assembly composed of a sheet-shaped positive electrode and negative electrode typically coiled with a sheet-shaped separator (coiled electrode assembly) is housed in an external case together with a suitable electrolyte (typically a liquid electrolyte or in other words an electrolyte solution) to make up the battery. The outer form of this lithium secondary battery is not particularly limited, and may be rectangular, flat plate, cylindrical or the like. The current interruption mechanism of this lithium secondary battery is not particular limited as long as it can interrupt the flow of current by means of a rise in internal pressure (that is, using a rise in internal pressure as an operational trigger), and a mechanism similar to any of those used conventionally as current interruption mechanisms in this type of battery can be adopted appropriately.

The present invention is explained in more detail below primarily as it applies to a lithium ion battery provided with a coiled electrode assembly, but this does not mean that the present invention can only be applied to such a battery.

As the lithium-transition metal oxide making up most of the positive electrode active material, one or two or more selected from the group consisting of the lithium-nickel oxides, lithium-cobalt oxides and lithium-manganese oxides can be used by preference. In addition to oxides having Li and Ni as constituent metal elements, a "lithium-nickel oxide" here may also be a composite oxide comprising one or two or more metal elements other than Li and Ni (that is, transition metal elements and/or typical metal elements other than Li and Ni) in proportions smaller than that of Ni (based on atomic number; if there are two or more metal elements other than Li and Ni, the proportion of each is less than that of Ni). This metal element may be one or two or more selected from the group consisting of Co, Al, Mn, Cr, Fe, V, Mg, Ti, Zr, Nb, Mo, W, Cu, Zn, Ga, In, Sn, La and Ce. Similarly, a "lithium-cobalt oxide" may be a composite oxide comprising one or two or more metal elements other than Li and Co in proportions smaller than that of Co, while a "lithium-manganese oxide" may be a composite oxide comprising one or two or more metal elements other than Li and Mn in proportions smaller than that of Mn. Preferred examples include lithium-nickel oxides and lithium-cobalt oxides. When the technology disclosed here is applied in fields where large batteries and/or large numbers of batteries are required as in vehicular power sources (motor power sources for hybrid automobiles for example), a lithium-nickel oxide is preferred for the lithium-transition metal oxide from the standpoint of raw materials costs and the like.

A lithium-transition metal oxide powder prepared and provided by conventional, known methods for example can be used as this (typically particulate) lithium-transition metal oxide. For example, a lithium-transition metal oxide powder effectively composed of secondary particles with an average particle size in the range of about 1 μm to 25 μm (typically about 2 μm to 15 μm) can be used favorably as the positive electrode active material in the technology disclosed here.

A conductive material similar to those used in the positive electrodes of common lithium-ion batteries can be adopted appropriately as the conductive material used in the aforementioned positive electrode. Examples of such conductive materials include carbon powder, carbon fiber and other carbon materials, and nickel powder and other conductive metal powders. One selected from such conductive materials can be used alone, or two or more may be used in combination. Carbon powders that can be used include various kinds of carbon black (for example, acetylene black, furnace black and Ketjen black), graphite powder and other carbon powders. Of these, acetylene black and/or furnace black can be used by preference. For example, it is desirable to use a conductive material in which the average particle size of the constituent particles (typically primary particles) is in the range of about 10 nm to 200 nm (such as about 20 nm to 100 nm). The specific surface area of the conductive material is not particularly limited but can be about 25 to 1000 $m^2/g$ (preferably 50 to 500 $m^2/g$).

In the technology disclosed here, the lithium carbonate, which serves as an internal pressure elevator, is disposed on the surface of the conductive material. Consequently, using a conductive material with a large surface area per unit of mass (that is, specific surface area) is a way of increasing the surface area of the lithium carbonate disposed on the conductive material (or in other words allowing the same volume of lithium carbonate to be spread more thinly over a larger area), and increasing the reaction efficiency of the lithium carbonate during overcharge. From this standpoint, it is desirable to use a conductive material with a specific surface area of about 100 $m^2/g$ or more (such as about 100 to 500 $m^2/g$). An acetylene black, furnace black (typically oil furnace black) or other carbon powder having such a specific surface area can be adopted by preference.

A positive electrode mixture layer containing the positive electrode active material, the conductive material and the lithium carbonate disposed on the surface of the conductive material can for example be one formed using a composite conductive material comprising any of the conductive materials disclosed here with lithium carbonate retained on the surface thereof. An example of a method for retaining lithium carbonate on the surface of the conductive material (that is, a method for preparing a composite conductive material) is to prepare a solution of lithium carbonate dissolved in a suitable solvent, add and mix to disperse a conductive material powder in the lithium carbonate solution, and dry the dispersion (preferably with agitation) to thereby coat the lithium carbonate on the surface of the conductive material. Another example of a method is to gradually supply (by spraying for example) a lithium carbonate solution to the conductive material powder while agitating the powder, and dry it to coat the lithium carbonate on the surface of the conductive material. The solvent used to prepare the lithium carbonate solution is not particularly limited as long as it can dissolve lithium carbonate, but it is normally desirable to use water (ion-exchange water or the like).

The amount of lithium carbonate retained per 1 $m^2$ of surface area of the conductive material in the composite conductive material can be about 0.2 mg to 20 mg for example. If the retained amount (coated amount) of lithium carbonate is too smaller than this range, a greater quantity of conductive material will be required for the desired amount of lithium carbonate to be contained in the positive electrode mixture layer, resulting in a relative smaller amount of the positive electrode active material in the positive electrode mixture layer, and thereby reducing the capacity density of the battery. If the retained amount of lithium carbonate is too greater than this range, the reaction efficiency of the lithium carbonate during overcharge will tend to be lower because the lithium carbonate is disposed more thickly on the surface of the conductive material. The lithium carbonate will also be more liable to detach from the surface of the conductive material (and further, attach to the surface of the positive electrode active material), so that in some cases the proper function of the conductive material (improving the conductivity of the positive electrode mixture layer) may be insufficient or difficult to achieve.

In the technology disclosed here, the positive electrode mixture layer can preferably be prepared using a positive electrode mixture composition comprising the positive electrode active material and the composite conductive material. For example, a positive electrode mixture composition can be prepared (compounded) having the aforementioned positive electrode active material and composite conductive material dispersed in a liquid medium containing a suitable solvent and a binder, and this composition (typically in paste or slurry form) can then be applied (typically coated) on the surface of the collector, and dried.

As the solvent in the liquid medium, a solvent (typically a non-aqueous solvent) that effectively does not dissolve lithium carbonate is preferably used. One or two or more selected from various organic solvents and the like conventionally used in preparing the positive electrode mixture compositions of lithium-ion batteries (so-called solvent-based positive electrode mixture compositions) can be used favorable as this solvent. For example, N-methyl-2-pyrrolidone (NMP), methylethyl ketone, toluene and other organic solvents can be used. Of these, NMP is a desirable example.

As the aforementioned binder, one or two or more selected from various polymers and the like conventionally used in preparing solvent-based positive electrode mixture compositions can be used favorably. Examples of such polymers include poly vinylidene fluoride (PVDF), poly vinylidene chloride (PVDC), polyethylene oxide (PEO), polypropylene oxide (PPO), polyethylene oxide-propylene oxide copolymer (PEO-PPO) and the like. Of these, PVDF and PVDC are desirable examples. A polymer that is soluble in the solvent is used by preference.

The proportion of positive electrode active material as a percentage of the solids in the positive electrode mixture composition (which is typically about the same as the proportion of positive electrode active material as a percentage of the positive electrode mixture layer as a whole) is preferably about 50 mass % or more (typically 50 to 95 mass %), and more preferably about 70 to 95 mass % or more (such as 75 to 90 mass %). The proportion of conductive material as a percentage of these solids can be about 2 to 20 mass %, or preferably about 2 to 15 mass %. The proportion of composite conductive material as a percentage of these solids (that is, the total of the conductive material and the lithium carbonate retained on the surface thereof) can be about 3 to 25 mass % for example, or preferably about 3 to 20 mass %. In compositions using binders, the proportion of the binder as a percentage of these solids can be about 1 to 10 mass % or preferably about 2 to 5 mass %.

Although this is not a limitation, an embodiment in which the positive electrode active material is first mixed with the aforementioned binder and solvent (preferably, until the positive electrode active material is uniformly dispersed), and the composite conductive material is then added to this mixture and mixed with agitation, can be adopted by preference for preparing the positive electrode mixture composition. With this embodiment, it is possible to reduce the agitation load (for example, by shortening the agitation time or reducing the agitation speed) after addition of the composite conductive material. As a result, it is possible to control the phenomena of lithium carbonate in the composite conductive material detaching from the conductive material surface when subjected to shear during agitation, detached lithium carbonate adhering to the surface of the positive electrode active material, or lithium carbonate on the conductive material moving onto the positive electrode active material due to collisions between the composite conductive material and positive electrode active material during agitation.

It is a feature of the technology disclosed here that lithium carbonate is intentionally disposed on the surface of the conductive material of the positive electrode (or in other words, the lithium carbonate in the positive electrode is disposed disproportionately on the surface of the conductive material), but embodiments in which lithium carbonate is present in locations other than the surface of the conductive material also are not excluded. Consequently, the concept of the positive electrode mixture layer disclosed here encompasses embodiments in which some (for example about 50 mass % or less or preferably 25 mass % or less or more preferably 10 mass % or less) of the lithium carbonate in the positive electrode, such as lithium carbonate remaining as unreacted matter from manufacture (synthesis) of the positive electrode active material or lithium carbonate that detaches from the composite conductive material during preparation of the positive electrode mixture layer, is unintentionally present in locations other than the surface of the conductive material (such as within or on the surface of the positive electrode active material).

In addition to the aforementioned composite conductive material, the aforementioned positive electrode mixture composition may also include conductive material having no lithium carbonate retained on the surface thereof. This independently included conductive material (hereunder sometimes called "independent conductive material) may be of the same material or a different material (for example, of a different substance and/or particle size) from the conductive material of the composite conductive material. When an independent conductive material and composite conductive material are both used, an embodiment in which the positive electrode active material and independent conductive material are first mixed with the aforementioned binder and solvent (preferably until uniform dispersion is achieved), and the composite conductive material is then added to this mixture and mixed with agitation, can be adopted by preference for preparing the positive electrode mixture composition. The positive electrode active material and independent conductive material can be mixed in any order, and may be compounded simultaneously.

The operation of applying the positive electrode mixture composition to the collector (typically a sheet collector) can be performed favorably using a suitable conventional coating device (slit coater, die coater, comma coater, gravure coater or the like). The positive electrode mixture layer is formed by drying the coated material (using a drying-promotion means (heater or the like) as necessary). The coated amount of the positive electrode mixture composition is not particularly limited, and may differ according to the shape and intended use of the positive electrode and battery. After a suitable amount of the positive electrode mixture composition has been coated and dried on a specific area of the surface (typically both surfaces) of the sheet positive electrode collector, it can be pressed as desired in the direction of thickness to obtain a positive electrode sheet of the desired thickness. A conventional method such as roll pressing, plate pressing or the like can be used as the pressing method.

An example of another embodiment for forming the positive electrode mixture layer is one involving press molding of a positive electrode mixture composition powder comprising the positive electrode active material, the composite conductive material and, typically, and binder (thermoplastic resin or the like).

One embodiment of the positive electrode provided by the present invention and a lithium-ion battery provided with this positive electrode are explained below with reference to the drawings.

Figure 1:
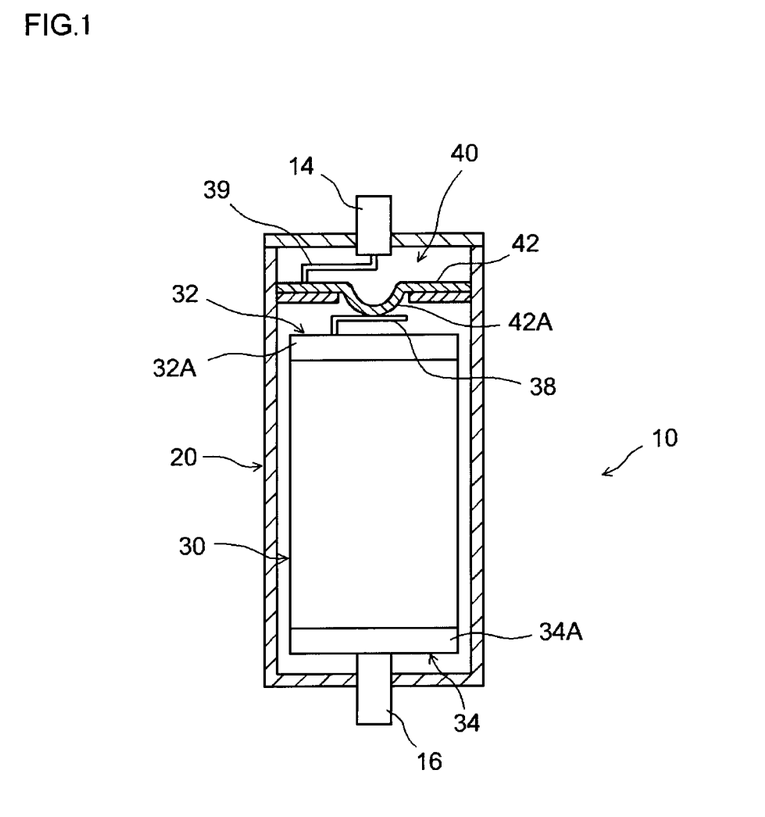
FIG. 1 is an explanatory drawing showing a model view of the configuration of a lithium secondary battery of one embodiment.

Generally speaking, as shown in the drawings, lithium-ion battery 10 of this embodiment is configured with coiled electrode assembly 30 contained in cylindrical case 20. A relatively lightweight metal material such as aluminum can be used by preference for the constituent material of case 20. FIG. 1 shows cylindrical case 20 with the front half of the case removed.

Figure 2:
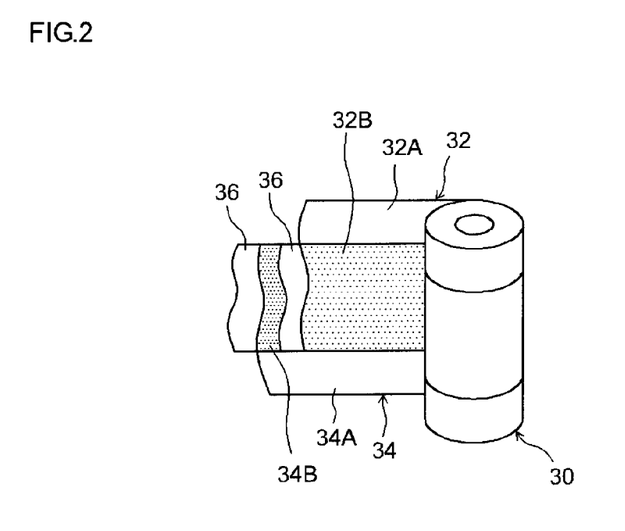
FIG. 2 is an explanatory drawing showing the configuration of electrode bodies making up the battery of one embodiment.

In coiled electrode assembly 30, as shown in FIG. 2, positive electrode sheet 32 having positive electrode mixture layer 32B formed as described above on one or both sides (typically both sides) of positive electrode collector 32A (which is a long sheet of aluminum foil for example), and negative electrode sheet 34 having negative electrode mixture layer 34B formed on one or both sides (typically both sides) of negative electrode collector 34A (which is a long sheet of copper foil for example) are overlaid with two long separator sheets 36, and coiled lengthways.

As the negative electrode active material for forming negative electrode mixture layer 34B, one or two or more substances conventionally used in lithium-ion batteries can be used, without any particular limitations. Favorable examples include graphite carbon, amorphous carbon and other carbon materials, lithium-transition metal oxides, lithium-transition metal nitrides and the like. It is desirable to use a carbon material (such as natural graphite) comprising a graphite structure (layered structure) for at least part. This negative electrode active material can be mixed with a binder (which can be similar to that used for the mixture layer of the positive electrode) and a conductive material as necessary (which can be similar to those used for the mixture layer of the positive electrode) to prepare a negative electrode mixture composition, which can then be coated on negative electrode collector 34A and dried to form negative electrode mixture layer 34B at the desired site on collector 34A. The amount of binder used can be in the range of 0.5 to 10 parts by mass per 100 parts by mass of the negative electrode active material, although this is not a limitation.

A porous film made of polyethylene, polypropylene or other polyolefin film can be used favorably for separator sheets 36.

As shown in FIG. 2, the aforementioned compositions are not coated along one edge in the lengthwise directions of both positive electrode sheet 32 and negative electrode sheet 34, resulting in areas without mixture layers 32B and 34B. When positive and negative electrode sheets 32 and 34 are overlaid with the two separator sheets 36, positive and negative electrode sheets 32 and 34 are offset somewhat so that mixture layers 32B and 34B are overlaid while the parts of the positive electrode sheet and negative electrode sheet without mixture layers are disposed separately on opposite edges extending in the lengthways direction. Coiled electrode assembly 30 is obtained by coiling the four sheets 32, 36, 34 and 36 in this state.

A coiled electrode assembly 30 of this configuration is housed in case 20 together with an electrolyte (not shown), and those parts of the positive electrode and negative electrode without mixture layers are in electrical contact, respectively, with positive electrode terminal 14 and negative electrode terminal 16, parts of which protrude outside case 20. Current interruption mechanism 40, which is operated by a rise in the internal pressure of case 20, is provided at the end (positive electrode end) of case 20 where the part of positive electrode sheet 32 without a mixture layer is located. This current interruption mechanism 40 is constituted mainly by diaphragm 42, which walls off part of the space at the positive electrode end of case 20. Diaphragm 42 is composed for example of a thin film of conductive metal (such as aluminum foil), and has in the middle pressure-receiving part 42A, which curves towards electrode assembly 30. An end of lead member 38, which connects to the part of positive electrode sheet 32 without a mixture layer, is joined by welding for example to the surface of pressure-receiving part 42A facing the electrode assembly. Diaphragm 42 and positive electrode terminal 14 are connected by connecting member 39, thereby forming a current pathway from positive electrode sheet 32 to positive electrode terminal 14. Diaphragm 42 and electrode terminals 14 and 16 are insulated from case 20 by insulating members (not shown).

The electrolyte may be similar to nonaqueous electrolytes used in conventional lithium-ion batteries, without any particular limitations. Typically, such a non-aqueous electrolyte consists of a supporting salt contained in a suitable non-aqueous solvent. One or two or more selected from ethylene carbonate, propylene carbonate, dimethyl carbonate, diethyl carbonate, ethylmethyl carbonate, 1,2-dimethoxyethane, 1,2-diethoxyethane, tetrahydrofuran, 1,3-dioxolane and the like for example can be used as the non-aqueous solvent. A lithium salt such as $LiPF_6$, $LiBF_4$, $LiAsF_6$, $LiCF_3SO_3$, $LiC_4F_9SO_3$, $LiN(CF_3SO_2)_2$, $LiC(CF_3SO_2)_3$ or the like can be used as the supporting salt.

When lithium ion battery 10 becomes overcharged, as the positive electrode potential rises the lithium carbonate in positive electrode mixture layer 32B (which is typically disposed mainly on the surface of the conductive material) produces $CO_2$ gas by electrochemical decomposition. This causes the pressure to rise in case 20 on the electrode assembly side of diaphragm 42 (in the electrode-containing space). When the pressure inside this electrode-containing space rises above a predetermined value, pressure-receiving part 42A reverses its shape (so that it curves towards the outside), breaking the bond between lead member 38 and diaphragm 42. This breaks the current pathway from positive electrode sheet 32 to positive electrode terminal 14 (interrupting the current in other words), thereby preventing further overcharge.

Figure 3:
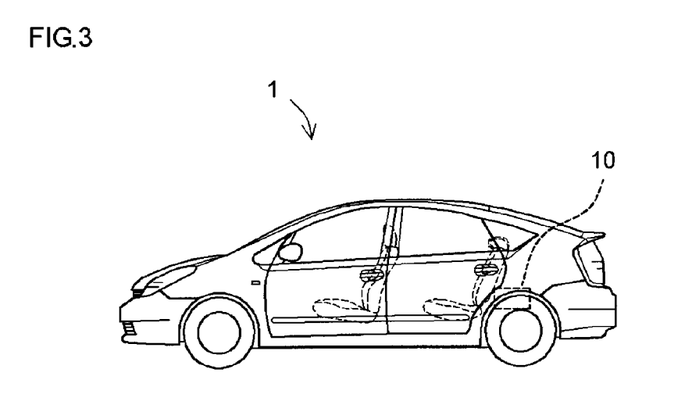
FIG. 3 is a model side view showing a vehicle (automobile) equipped with the lithium secondary battery of one embodiment.

As discussed above, the lithium secondary battery (typically, lithium-ion battery) of the present invention is constructed using a positive electrode formed using lithium carbonate as an internal pressure elevator, but since the rise in internal resistance due to use of lithium carbonate is controlled, the battery can provide excellent battery performance (output performance, etc.). Thus, this battery can be used favorably for example as the power source of a motor mounted in an automobile or other vehicle. This lithium-ion battery can also be used in the form of an assembled battery composed of multiple such batteries connected serially or in parallel. Therefore, as shown in FIG. 3, the present invention provides vehicle 1 (typically an automobile, especially a hybrid automobile, electrical automobile, fuel cell automobile or other automobile having a motor) having this lithium-ion battery 10 (which may be in the form of an assembled battery) as a power source.

Some embodiments of the present invention are explained below, but the present invention is not limited to what is shown in these examples.

EXAMPLE 1

Carbon black (specific surface area 39 $m^2/g$, average particle size 48 nm) as the conductive material was added to a lithium carbonate aqueous solution, and mixed to prepare a dispersion containing carbon black (CB) and lithium carbonate in a mass ratio of 10:4. This dispersion was dried to obtain a composite conductive material powder (lithium carbonate coating volume 10.3 $mg/m^2$) comprising CB coated with lithium carbonate.

A positive electrode mixture composition was prepared using this composite conductive powder. That is, lithium nickelate (LiNiO$_2$) powder as the positive electrode active material, the aforementioned composite conductive material powder and PVDF were mixed with NMP (organic solvent) to a mass ratio of 87:14:3 of the three materials and a solids concentration (NV) of about 40 mass %. More particularly, the positive electrode active material was first mixed with the composite conductive material powder, and this mixed powder was then mixed for 2 hours with agitation with a NMP solution of PVDF to obtain the positive electrode mixture composition.

The resulting positive electrode mixture composition was coated on both sides of a 15 μm-thick strip of aluminum foil (collector), and dried to form positive electrode mixture layers. The coated amount (as solids) of the composition was adjusted to about 12.8 g/m$^2$ for both surfaces. The sheet-like positive electrode (positive electrode sheet) of this example was prepared in this way.

Natural graphite (powder), SBR and CMC were also mixed with ion-exchange water to a mass ratio of 98:1:1 of the three materials and an NV of 45 mass % to prepare a water-based active material composition (negative electrode active material composition). This composition was coated on both sides of a strip of copper foil (negative electrode collector) to a thickness of about 15 μm, and dried to form negative electrode mixture layers. The sheet-like negative electrode (negative electrode sheet) of this example was prepared in this way.

The positive electrode sheet and negative electrode sheet prepared above were laminated with two separator strips (using porous polyethylene sheets in this case), and the laminated sheet was coiled in the lengthwise direction to prepare a coiled electrode assembly. This electrode assembly was housed in an outer case together with a non-aqueous electrolyte (using an electrolyte with a composition of LiPF$_6$ dissolved to a concentration of 1 mol/L in a mixed solvent of EC and DEC (volume ratio 3:7)), and a 18650 lithium-ion battery was constructed having the same current interruption mechanism as in FIG. 1. The current interruption mechanism was designed so as to operate (that is, to interrupt current) when the internal pressure in the space containing the electrode assembly reached 0.5 MPa or more.

EXAMPLE 2

In this example, the same component materials of the positive electrode mixture composition were used in the same proportions as in Example 1, but the positive electrode mixture composition was prepared by a different procedure than in Example 1. That is, the positive electrode active material powder was mixed for 1 hour with an NMP solution of PVDF (first mixing step), and the same composite conductive material powder as in Example 1 was then added thereto and mixed for 1 hour (second mixing step) to obtain the positive electrode mixture composition.

A positive electrode sheet was prepared as in Example 1 but using a positive electrode mixture composition prepared in this way, and this positive electrode sheet was used to construct a 18650 lithium-ion battery.

EXAMPLE 3

In this example, rather than using a composite conductive material powder comprising a conductive material coated with lithium carbonate, the conductive material and lithium carbonate were added separately to prepare the positive electrode mixture composition. That is, a positive electrode active material powder, the same conductive material (CB) powder used in Example 1, lithium carbonate powder and PVDF were mixed with NMP (organic solvent) to a mass ratio of 87:10:4:3 of the four materials and a solids concentration (NV) of about 40 mass %. In more detail, the positive electrode active material powder, conductive material powder and lithium carbonate powder were mixed first, and this mixed powder was then mixed for 2 hours with an NMP solution of PVDF to obtain a positive electrode mixture composition.

A positive electrode sheet was prepared as in Example 1 but using the positive electrode mixture composition prepared in this way, and this positive electrode sheet was used to construct a 18650 lithium-ion battery.

EXAMPLE 4

In this example, a positive electrode mixture composition was prepared using a composite active material powder comprising the positive electrode active material powder coated with lithium carbonate instead of a composite conductive material powder comprising a conductive material coated with lithium carbonate. This composite active material powder was prepared by adding a positive electrode active material powder to an aqueous solution of lithium carbonate, mixing to prepare a dispersion containing the positive electrode active material and lithium carbonate at a mass ratio of 87:4, and drying the dispersion. This composite active material powder, the same conductive material powder used in Example 1 and PVDF were mixed with NMP (organic solvent) to a ratio of 91:10:3 of the three materials and a solids concentration (NV) of about 40 mass % to obtain a positive electrode mixture composition. More specifically, the composite active material powder and conductive material powder were first mixed, and this mixed powder was then mixed for 2 hours with an NMP solution of PVDF.

A positive electrode sheet was prepared as in Example 1 but using the positive electrode mixture composition prepared in this way, and this positive electrode sheet was used to construct a 18650 lithium-ion battery.

The lithium-ion batteries constructed in Examples 1 to 4 were subjected to suitable conditioning (for example, initial charge-discharge treatment consisting of 2 to 3 repetitions of an operation of 3 hours of constant-current charging at a charge rate of 1/10 C followed by constant-current constant-voltage charging at a charge rate of 1/3 C up to 4.1 V and an operation of constant-current discharging at a discharge rate of 1/3 C down to 3.0 V), and the internal resistance (IV resistance value) of each battery was measured. That is, each battery was first subjected to constant-current discharge to 3.0 V under temperature conditions of 25° C., and then charged at constant current, constant voltage to adjust the SOC (state of charge) to 60%. Next, the battery was alternately discharged and charged for 10 seconds at 25° C. under conditions of 1 C, 3 C and 5 C, and the voltage values 10 seconds after the start of discharge were plotted to produce an I-V characteristics graph for each battery. The IV resistance value (mΩ) at 25° C. was calculated from the gradient of the I-V characteristics graph. Internal resistance was measured in this way for three batteries of each type (n=3), and the averages are given in Table 1.

The lithium-ion batteries constructed in Examples 1 to 4 were also subjected to the same conditioning treatment, and then overcharge tested as described below. That is, each battery was first discharged at a constant current to 3.0 V under temperature conditions of 25° C., and then charged at constant current, constant voltage to adjust the SOC (state of charge) to 100%. The battery in this fully charged state was then further charged at a constant current of 0.8 A (overcharge current), and charging was continued until the current interruption mechanism operated. The condition of the battery during overcharge and the appearance of the battery after operation of the current interruption mechanism (that is, after completion of the test) were observed, and the current interruption mechanism was judged to have operated quickly enough if it operated before any heat generation, case deformation or the like could occur due to a rapid rise in temperature. Ten batteries of each type were overcharge tested in this way, and the percentage of batteries that achieved quick operation is shown in Table 1 under "quick interruption".

TABLE 1

|  | Preparation method | Internal resistance [mΩ] | Quick interruption [%] |
|---|---|---|---|
| Ex. 1 | Conductive material coated with Li$_2$CO$_3$ and mixed | 54 | 100 |
| Ex. 2 | Conductive material coated with Li$_2$CO$_3$ and mixed later | 50 | 100 |
| Ex. 3 | Li$_2$CO$_3$ mixed independently | 76 | 100 |
| Ex. 4 | Positive electrode active material coated with Li$_2$CO$_3$ and mixed | 83 | 100 |

As shown in Table 1, internal resistance was much lower (by 30% or more) in the batteries of Examples 1 and 2, in which a conductive material was coated with lithium carbonate (that is, using a positive electrode mixture composition prepared using a composite conductive material) than in the battery of Example 3, which was provided with a positive electrode mixture layer formed with a positive electrode mixture composition formed by mixing lithium carbonate by itself A much greater difference was seen in the battery of Example 4, in which the lithium carbonate was coated on the positive electrode active material. These results support the effectiveness of lithium carbonate when distributed disproportionately on the surface of a conductive material. In the battery of Example 2 in which the composite conductive material was mixed later when preparing the positive electrode mixture composition, internal resistance was reduced more than in the battery of Example 1. This is attributed to the fact that adherence of lithium carbonate to materials other than the conductive material is prevented more effectively in the preparation method of Example 2. It was confirmed that the batteries of Examples 1 and 2 both exhibit quick interruption comparable to that of the batteries of Example 3 and 4 (and consequently act accurately as internal pressure elevators).

EXAMPLE 5

In this example, CB (average particle size 25 nm) with a specific surface area of 90 m$^2$/g was used instead of the conductive material used in Example 1. Using this CB, a composite conductive material powder (lithium carbonate coating volume 4.4 mg/m$^2$) was prepared as in Example 1 comprising CB and lithium carbonate at a mass ratio of 10:4, and a lithium-ion battery was constructed as in Example 1 using this conductive material powder.

EXAMPLE 6

In this example, CB (average particle size 21 nm) with a specific surface area of 133 m$^2$/g was used instead of the conductive material used in Example 1. Using this CB, a composite conductive material power (lithium carbonate coating volume 3.0 mg/m$^2$) was prepared as in Example 1, and a lithium-ion battery was constructed as in Example 1 using this conductive material powder.

EXAMPLE 7

In this example, CB (average particle size 25 nm) with a specific surface area of 225 m$^2$/g was used instead of the conductive material used in Example 1. Using this CB, a composite conductive material powder (lithium carbonate coating volume 1.8 mg/m$^2$) was prepared as in Example 1, and a lithium-ion battery was constructed as in Example 1 using this conductive material powder.

The batteries of Examples 5 to 7 were subjected to internal resistance measurement and overcharge testing by the methods described above. The batteries of Example 1 and Examples 5 to 7 were also subjected to quick overcharge testing similar to the aforementioned overcharge testing except that the overcharge current was changed from 0.8 A to 5 A, and quick current interruption was evaluated in the same way. The results are shown in Table 2 below.

TABLE 2

|  | Specific surface area [m$^2$/g] | Internal resistance [mΩ] | Quick interruption [%] Overcharge current 0.8 A | Quick interruption [%] Overcharge current 5 A |
|---|---|---|---|---|
| Ex. 1 | 39 | 54 | 100 | 40 |
| Ex. 5 | 90 | 52 | 100 | 80 |
| Ex. 6 | 133 | 52 | 100 | 100 |
| Ex. 7 | 225 | 51.5 | 100 | 100 |

As shown in Table 2, the batteries of Example 1 and Examples 5 to 7 exhibited good current interruption under conditions of 0.8 A overcharge current. In the batteries of Examples 6 and 7 using conductive materials with specific surface areas of 100 m$^2$/g or more (specifically 100 to 250 m$^2$/g), the current interruption mechanism operated more quick even at a higher current (for example, high current of about 2 to 10 A, or 5 A in this case) than in Examples 1 and 5 using conductive materials with specific surface areas of less than 100 m$^2$/g.

The present invention was explained in detail above, but these embodiments are only examples, and various modifications and variants of the specific examples given above are also included within the scope of the invention disclosed here.

The invention claimed is:
1. A lithium secondary battery, comprising:
a positive electrode;
a negative electrode; and
a current interruption mechanism operated by a rise in internal pressure;
wherein the positive electrode has a positive electrode mixture layer containing lithium carbonate, a conductive material and a positive electrode active material consisting primarily of a lithium-transition metal oxide, the conductive material and the positive electrode active material being present in a particulate form with particles consisting of positive electrode active material and lithium carbonate, the particles consisting of positive electrode active material and lithium carbonate being present separately from conductive material-containing particles, the specific surface area of the conductive material is 100 to 500 $m^2/g$, the conductive material comprises at least one kind of carbon powder selected from the group consisting of acetylene black and furnace black, the average particle size of each of the conductive material-containing particles is in the range of 10 nm to 200 nm, a portion of the lithium carbonate in the positive electrode is disposed on the surface of each of the conductive material-containing particles, the amount of lithium carbonate within or on the surface of the particles consisting of positive electrode active material and lithium carbonate is 25 mass % or less of the lithium carbonate in the positive electrode, the amount of lithium carbonate per 1 $m^2$ surface area of the conductive material-containing particles is 0.5 mg to 5 mg, and the percentage content of the lithium carbonate in the positive electrode mixture layer is 3.8 mass% to 10 mass%.

2. A vehicle comprising the lithium secondary battery according to claim 1.

3. The lithium secondary battery according to claim 1, used as a power source for driving a vehicle.

4. The lithium secondary battery according to claim 1, wherein the specific surface area of each of the conductive material-containing particles is 100 $m^2/g$ to 250 $m^2/g$.

5. The lithium secondary battery according to claim 1, wherein the amount of lithium carbonate per 1 $m^2$ surface area of the conductive material-containing particles is 1 mg to 4 mg.

6. The lithium secondary battery according to claim 1, wherein the amount of lithium carbonate disposed on the surface of the conductive material-containing particles is larger than the amount of lithium carbonate within or on the surface of the particles consisting of positive electrode active material and lithium carbonate.

* * * * *